US012394081B2

(12) United States Patent
Gimenez et al.

(10) Patent No.: US 12,394,081 B2
(45) Date of Patent: Aug. 19, 2025

(54) STEREOVISION ANNOTATION TOOL

(71) Applicant: QUALCOMM Incorporated, San Diego, CA (US)

(72) Inventors: Gary Franklin Gimenez, Bordeaux (FR); Ophir Paz, Floirac (FR)

(73) Assignee: QUALCOMM Incorporated, San Diego, CA (US)

( * ) Notice: Subject to any disclaimer, the term of this patent is extended or adjusted under 35 U.S.C. 154(b) by 303 days.

(21) Appl. No.: 17/821,627

(22) Filed: Aug. 23, 2022

(65) Prior Publication Data
US 2024/0070892 A1 Feb. 29, 2024

(51) Int. Cl.
*G06T 7/70* (2017.01)
*G06V 10/774* (2022.01)
*G06V 40/20* (2022.01)

(52) U.S. Cl.
CPC ............. *G06T 7/70* (2017.01); *G06V 10/774* (2022.01); *G06V 40/28* (2022.01); *G06T 2207/20081* (2013.01)

(58) Field of Classification Search
None
See application file for complete search history.

(56) References Cited

U.S. PATENT DOCUMENTS

| | | | |
|---|---|---|---|
| 2013/0101170 A1* | 4/2013 | Park | G06T 7/10 382/103 |
| 2013/0127824 A1* | 5/2013 | Cohen | G06T 7/162 345/419 |
| 2014/0177004 A1* | 6/2014 | Song | H04N 1/00005 358/3.26 |
| 2016/0247045 A1* | 8/2016 | He | G06F 18/214 |
| 2021/0042950 A1* | 2/2021 | Wantland | G06T 19/006 |
| 2021/0409726 A1* | 12/2021 | Shin | H04N 19/186 |

FOREIGN PATENT DOCUMENTS

CN 101625768 A * 1/2010

OTHER PUBLICATIONS

Machine Translation CN101625768A (Year: 2010).*
(Continued)

*Primary Examiner* — Michelle M Entezari Hausmann
(74) *Attorney, Agent, or Firm* — Patterson & Sheridan LLP / QUALCOMM Incorporated

(57) ABSTRACT

Certain aspects of the present disclosure provide techniques for generating three-dimensionally coherent training data for image-detection machine learning models. Embodiments include receiving a first image of an object from a first perspective and a second image of the object from a second perspective. Embodiments include receiving user input identifying a location in the first image corresponding to a point on the object. Embodiments include displaying a range of possible locations in the second image corresponding to the point on the object based on the location in the first image. Embodiments include generating training data for a machine learning model based on updated user input associated with the range of possible locations.

26 Claims, 5 Drawing Sheets

(56) References Cited

OTHER PUBLICATIONS

Cai Z., et al., "MessyTable: Instance Association in Multiple Camera Views", arxiv.org, Cornell University Library, 201 Olin Library Cornell University Ithaca, NY 14853, Jul. 29, 2020, XP081729082, 27 Pages, Abstract, Sections 3.3-4.3, Appendix C, Table 2.
Cai Z., "Instance Association in Multi Camera Views Unsupervised 3D Shape Completion", Sep. 2, 2021, 2 Pages, XP093082337, Time 12:00-17:30, Time 31:45-33:15.
International Search Report and Written Opinion—PCT/US2023/070564—ISA/EPO—Sep. 26, 2023.

\* cited by examiner

STEREOVISION ANNOTATION TOOL

INTRODUCTION

Aspects of the present disclosure relate to machine learning.

Machine learning has revolutionized many aspects of computer vision. Yet, using machine learning to identify points on an object in image data in a manner that is three-dimensionally coherent remains a challenging computer vision task relevant to many useful ends. For example, while conventional techniques may allow a location of a fingertip to be identified in an image, the identified location may not be accurate from a three-dimensional perspective. For instance, if another image of the fingertip were taken from a different perspective, a location of the fingertip in the other image may not be consistent with the identified location in the first image.

Training machine learning models for computer vision tasks is generally performed using supervised machine learning techniques, which require significant amounts of well-prepared training data (e.g., training data with accurate labels at a pixel-level for image data). Unfortunately, in many real world applications, such data is generally not available and difficult to acquire, particularly image data with labels that are three-dimensionally coherent. Thus, it is difficult if not impossible in practice to train high-performance models for three-dimensionally coherent identification of points on objects in many contexts.

Accordingly, there is a need for improved machine learning techniques for identifying locations of points on objects in images.

BRIEF SUMMARY

Certain aspects provide a method, including: receiving a first image of an object from a first perspective; receiving a second image of the object from a second perspective; receiving user input identifying a location in the first image corresponding to a point on the object; displaying a range of possible locations in the second image corresponding to the point on the object based on the location in the first image; receiving updated user input identifying an updated location in the first image corresponding to the point on the object based on the range of possible locations not including the point on the object in the second image; displaying an updated range of possible locations in the second image corresponding to the point on the object based on the updated location in the first image; and generating training data for a machine learning model based on the updated user input.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain aspects of the one or more aspects and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1A:
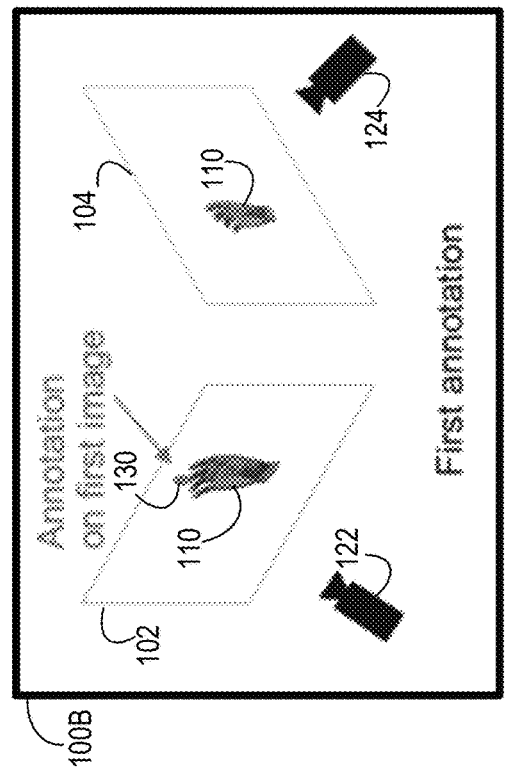
FIGS. 1A-1E are illustrations of example steps related to generating three-dimensionally coherent training data for image-detection machine learning models.

Aspects of the present disclosure provide apparatuses, methods, processing systems, and non-transitory computer-readable mediums for generating three-dimensionally coherent training data for image-detection machine learning models.

Identifying three-dimensionally coherent locations of particular points on objects in images is a valuable capability in computer vision applications, which can be used in augmented reality, simultaneous localization and mapping (SLAM), navigation, object detection, key-point identification and tracking, and semantic segmentation, to name just a few examples. For example, determining a three-dimensionally coherent location of a point on an object in an image is useful for depth perception, obstacle avoidance (e.g., for drones flying (semi-) autonomously, cars driving (semi-) autonomously or w/assistance, warehouse robots operating (semi-) autonomously, household and other robots generally moving (semi-) autonomously, 3D construction of an environment, spatial scene understanding, receiving user input via gestures, augmenting particular points on objects in images with additional data, and/or other examples.

Machine learning models for computer vision tasks are generally trained through supervised training techniques based on labeled training data. For example, one or more users may annotate images with locations of particular points of interest in the images, and the annotations may be used as labels for training data. Images from the training data may be provided as inputs to a machine learning model and one or more parameters of the machine learning model may be iteratively adjusted until one or more outputs from the model based on the inputs are consistent with the labels in the training data or until one or more conditions are met.

A challenge for training such machine learning models is acquiring training data that is three-dimensionally coherent. For example, a user may annotate images with locations of particular points on objects, but small inaccuracies (e.g., being only a few pixels off from the precise location of the point) in the annotations may result in locations that are not three-dimensionally coherent. Reasons for such inaccuracies in annotations include a lack of depth information in images and complete or partial occlusion of points in the images. For example, if a particular finger is hidden behind one or more other fingers in an image, it may be difficult to precisely annotate the image with a location of a fingertip of the particular finger, and the resulting lack of precision may cause the annotation to not be three-dimensionally coherent.

Advantageously, embodiments of the present disclosure involve utilizing stereo images in a guided process for improved precision in annotations for generating training data that is three-dimensionally coherent. In particular two images of an object are captured from different perspectives. The user is then provided with a first of the two images to identify a location in the image of a point on the object. Once the user identifies a location in the first image, the location is used to determine a set of possible locations of the point on the object in the second image. For example, ray casting may be used to generate a line representing an epipolar geometric constraint in the second image based on the location identified by the user in the first image. The set of possible locations of the point in the second image (e.g., represented by a line) may be displayed to the user in the second image, and the user may determine whether an actual location of the point in the second image is included in the set of possible locations (e.g., whether the displayed line intersects the actual location of the point in the second image). The user may then provide input indicating whether the actual location of the point in the second image is included in the set of possible locations and, in some embodiments, identifying the actual location if it is included in the set.

If the user input indicates that the actual location of the point in the second image is included in the set of possible locations, then the location identified by the user in the first image may be determined to be three-dimensionally coherent, and the annotated first image may be used as training data for a machine learning model. The annotated second image may also be used as training data for the machine learning model if the user provides the actual location of the point in the second image (e.g., by selecting a point on the displayed line).

If the user input indicates that the actual location of the point in the second image is not included in the set of possible locations, then the user may be prompted to provide an updated location of the point in the first image (e.g., since the originally-identified location is not three-dimensionally coherent and is therefore inaccurate). An updated set of possible locations of the point in the second image is then determined and displayed to the user for updated input. The process may be iteratively repeated until input is received from the user indicates that the actual location of the point in the second image is included in a displayed set of possible locations of the point in the second image. Once such input is received, the annotated first image (and, in some embodiments, the annotated second image) may be used as training data for a machine learning model.

Notably, while stereo images are used to improve accuracy and three-dimensional coherency of image annotations in embodiments of the present disclosure, the resulting annotated images may be used as training data for a machine learning model that identifies locations of objects in single (e.g., mono) images. Thus, by relying on stereo images to ensure three-dimensional coherence of training data, techniques described herein allow machine learning models to be trained to identify three-dimensionally coherent locations of points on objects in non-stereo images.

By ensuring three-dimensional coherence of annotations through a guided feedback loop, embodiments of the present disclosure produce training data that is more accurate, thereby resulting in improved machine learning models that output more accurate results. As such, techniques described herein constitute a clear technical improvement with respect to existing machine learning techniques.

Example Process for Generating Three-Dimensionally Coherent Training Data for Machine Learning Models FIG. 1A includes an illustration 100A of an image acquisition stage related to generating three-dimensionally coherent training data for image-detection machine learning models.

Cameras 122 and 124 are used to capture two images 102 and 104, from two different perspectives, of an object 110 (e.g., a human hand). Images 102 and 104 together make up a stereo image, and represent different perspectives of the same object 110 captured at the same time.

Figure 1B:
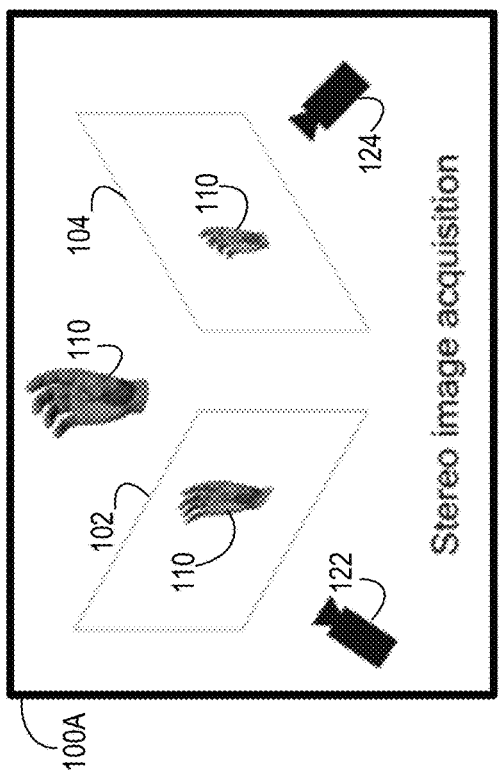

FIG. 1B includes an illustration 100B of an image annotation stage related to generating three-dimensionally coherent training data for image-detection machine learning models.

In an example, image 102 is displayed to a user, and the user provides input identifying a location 130 in image 102 of a point on object 110, such as a fingertip on a hand. For example, the user may select location 130 through touch input on a touchscreen, by clicking on location 130 using a cursor, or via some other form of input.

Figure 1C:
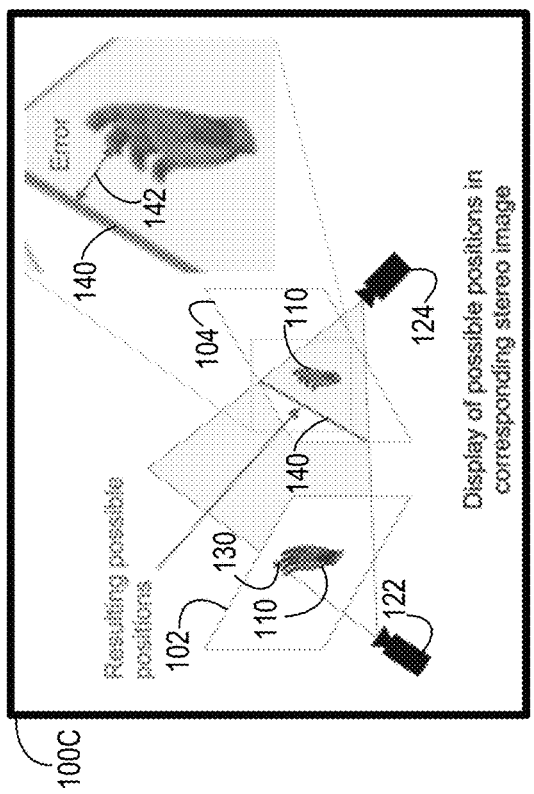

FIG. 1C includes an illustration 100C of a three-dimensional coherence check stage related to generating three-dimensionally coherent training data for image-detection machine learning models.

A line 140 representing a set of possible locations in image 104 of the point on object 110 is determined based on location 130. For example, ray casting may be used to determine an epipolar geometric constraint with respect to image 104 based on location 130 in image 102 and based on relative locations of cameras 122 and 124.

When the relative positions of two cameras by which two images of an object are captured are known, certain conclusions may be drawn. For example, a point x may represent a point on an object (e.g., a fingertip on a hand), $x_1$ may represent a location of point x in a first image (e.g., image 102), and $x_2$ may represent a location of point x in a second image (e.g., image 104). If point $x_1$ is known (e.g., location 130), and the epipolar line corresponding to point $x_1$ in the second image is known, the point x projects into the second image on a point $x_2$ which must lie on this particular epipolar line. Thus, for each point observed in the first image, the same point must be observed in the other image on a known epipolar line. This provides an epipolar geometric constraint.

The epipolar line in the second image may determined based on point $x_1$ and the relative positions of cameras 122 and 124 (e.g., the optical center $O_1$ of the lens of the first camera 122 and the optical center $O_2$ of the lens of the second camera 124). Since the optical centers of the cameras' lenses are distinct, each center projects onto a distinct point in the other camera's image plane. These two image points, denoted by $e_1$ (representing the projection of the optical center $O_2$ of the lens of the second camera 124 in the image plane of the first camera 122) and $e_2$ (representing the projection of the optical center $O_1$ of the lens of the first camera 122 in the image plane of the second camera 124) are called epipoles or epipolar points.

The line $O_{1-x}$ is seen by the first camera 122 as a point because it is directly in line with that camera's lens optical center. The second camera 124 sees this line as a line in its image plane. That line ($e_2$-$x_2$) in the second camera 124 is called an epipolar line. The epipolar line $e_2$-$x_2$ may, in some embodiments, be determined using a rotation matrix and/or translation vector describing the relative pose between the two cameras 122 and 124, as is known in the art. In certain embodiments, line 140 represents the epipolar line $e_2$-$x_2$ in the second image 104.

Image 104 may be displayed along with line 140 to the user. In certain embodiments, the user provides input indicating whether a location of the point on the object in image 104 is included in the set of possible locations represented by line 140. As shown in illustration 100C, if location 130 in image 102 was not precise, there may be a gap 142 between line 140 and the actual location of the point on the object in image 104. This error indicates a lack of accuracy for location 130. Thus, the user may provide input indicating that the actual location of the point on the object in image 104 is not included in the set of possible locations represented by line 140.

Figure 1D:
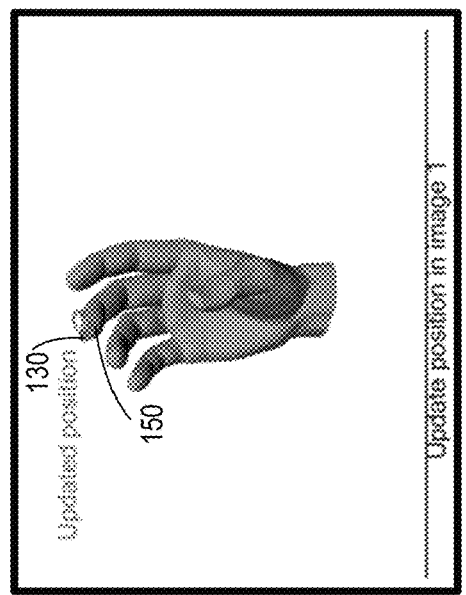

FIG. 1D includes an illustration 100D of an updated image annotation stage related to generating three-dimensionally coherent training data for image-detection machine learning models.

In an example, in response to receiving input indicating that the actual location of the point on the object in image 104 of FIG. 1C is not included in the set of possible locations represented by line 140 of FIG. 1C, image 102 of FIG. 1C is displayed to a user for updated annotation. The user provides input identifying an updated location 150 (replacing location 130) in image 102 of the point on object 110. For example, the user may select location 150 through touch input on a touchscreen, by clicking on location 150 using a cursor, or via some other form of input.

Figure 1E:
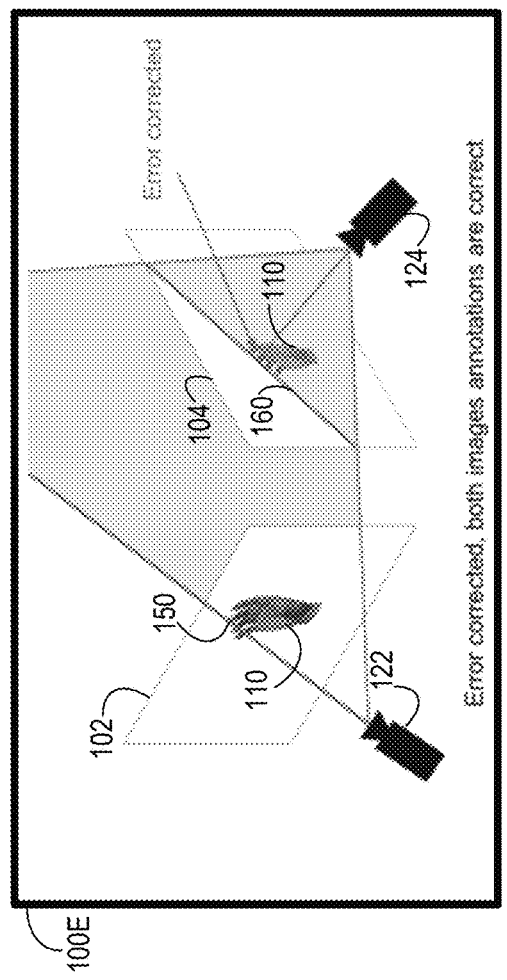

FIG. 1E includes an illustration 100E of an updated three-dimensional coherence check stage related to generating three-dimensionally coherent training data for image-detection machine learning models.

A line 160 representing a set of possible locations in image 104 of the point on object 110 is determined based on location 150. For example, as described above with respect to FIG. 1C, line 160 may represent an epipolar geometric constraint with respect to image 104 based on location 150 in image 102 and based on relative positions of cameras 122 and 124.

Image 104 may be displayed along with line 146 to the user. In certain embodiments, the user provides input indicating whether an actual location of the point on the object in image 104 is included in the set of possible locations represented by line 160. As shown in illustration 100E, the error represented by gap 142 in FIG. 1C has been corrected based on updated location 150, and so an actual location of the point is included in the set of possible locations represented by line 160. The user may provide input confirming that the actual location in image 104 of the point on the object is included in the set of possible locations represented by line 160 and, in some embodiments, identifying the actual location in image 104 of the point on the object (e.g., by selecting a point on line 160).

Once user input has confirmed that the actual location in image 104 of the point on the object is included in the set of possible locations represented by line 160, and that location 150 is therefore three-dimensionally coherent, image 102 annotated with location 150 may be used as training data for a machine learning model. Furthermore, if the user identifies the actual location in image 104 of the point on the object, image 104 annotated with the user-identified actual location of the point on the object may also be used as training data for the machine learning model.

In alternative embodiments, if user input were to indicate that a gap still remained between line 160 and the actual location in image 104 of the point on the object, then the process described with respect to FIGS. 1D and 1E may be repeated until user input is received confirming that the actual location in image 104 of the point on the object is included in a set of possible locations displayed to the user.

It should be noted that though the process described with respect to FIGS. 1A-1E is described as occurring with certain stages being performed separately or serially, such as the user selecting a point on a first image, and then separately displaying the second image with the epipolar line, in certain aspects, certain stages may be performed more in parallel (e.g., with more real-time feedback). For example, in certain aspects, both the first image 102 and second image 104 may be simultaneously displayed. Further, when a user provides input corresponding to a location on the first image 102, the corresponding epipolar line may be displayed on the second image 104. As the user moves the input location on the first image 102 (e.g., by moving a finger on a touch screen, clicking and dragging, etc.), the epipolar line may be updated on the second image 104. Accordingly, a user can keep moving the input location on the first image, while watching the updating epipolar line on the second image 104, until a suitable input location on the first image 102 is determined.

As described in more detail below with respect to FIG. 2, training data generated using the guided feedback loop described with respect to FIGS. 1A-1E may be used to train a machine learning model for determining a three-dimensionally coherent location of a point on an object in a given image.

Example Model Training

Figure 2:
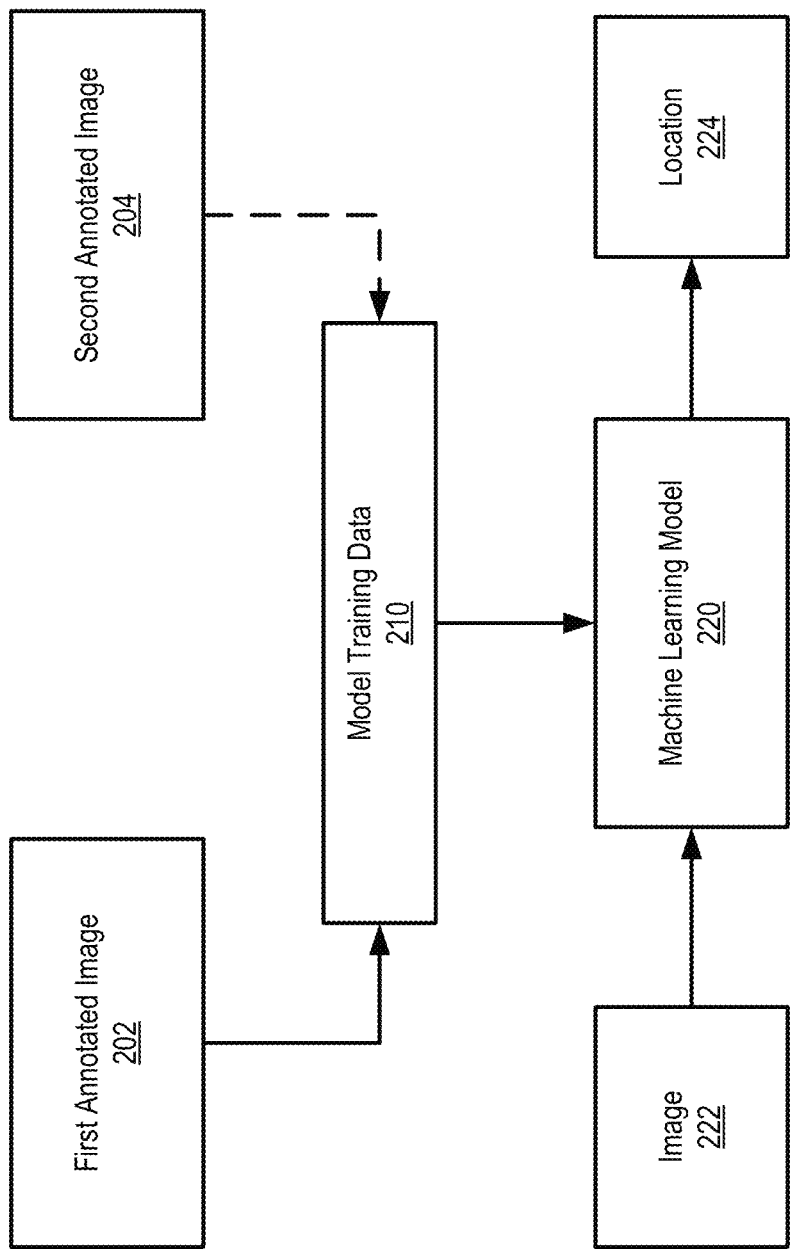
FIG. 2 depicts an example related to training of a machine learning model for three-dimensionally coherent image detection according to embodiments of the present disclosure.

FIG. 2 depicts an example related to training of a machine learning model for three-dimensionally coherent image detection according to embodiments of the present disclosure.

A first annotated image 202 (e.g., corresponding to image 102 annotated with location 160 of FIG. 1E) and, in some embodiments, a second annotated image 204 (e.g., corresponding to image 104 of FIG. 1E annotated with a user-identified actual location of the point on the object in the image) are used to generate model training data 210. Model training data 210 may include data describing one or more images (e.g., features describing the images and/or the actual data of the images) associated with labels indicating locations of particular points of interest in the images (e.g., locations of fingertips on hands in the images). Locations may be represented, for example, by XY coordinates with respect to the images (e.g., relative to a bottom left corner of the images or another origin point).

Model training data 210 is used to train machine learning model 220. In some embodiments, training of machine learning model 220 may be a supervised learning process that involves providing training inputs (e.g., features describing an image) as inputs to the model. The model processes the training inputs and outputs locations (e.g., XY coordinates with respect to the images) with respect to the training inputs. The outputs are compared to labels (e.g., known locations of points of interest) associated with the training inputs to determine the accuracy of the model, and the model is iteratively adjusted until one or more conditions are met. Machine learning model 220 may, for example, comprise a neural network. Neural networks generally include a collection of connected units or nodes called artificial neurons. The operation of neural networks can be modeled as an iterative process. Each node has a particular value associated with it. In each iteration, each node updates its value based upon the values of the other nodes, the update operation typically consisting of a matrix-vector multiplication. The update algorithm reflects the influences on each node of the other nodes in the network.

Once machine learning model 220 is trained, inputs may be provided to machine learning model 220 based on an image 222, and machine learning model 220 outputs a location 224 within image 222, such as indicating a location of a point on an object in image 222 (e.g., a fingertip on a hand in image 222). Training machine learning model 220 based on three-dimensionally coherent training data as described herein ensures that location 224 output by machine learning model 220 will be three-dimensionally coherent, and therefore more precise than a location that may be output by a model trained using training data that is not three-dimensionally coherent.

Example Method

Figure 3:
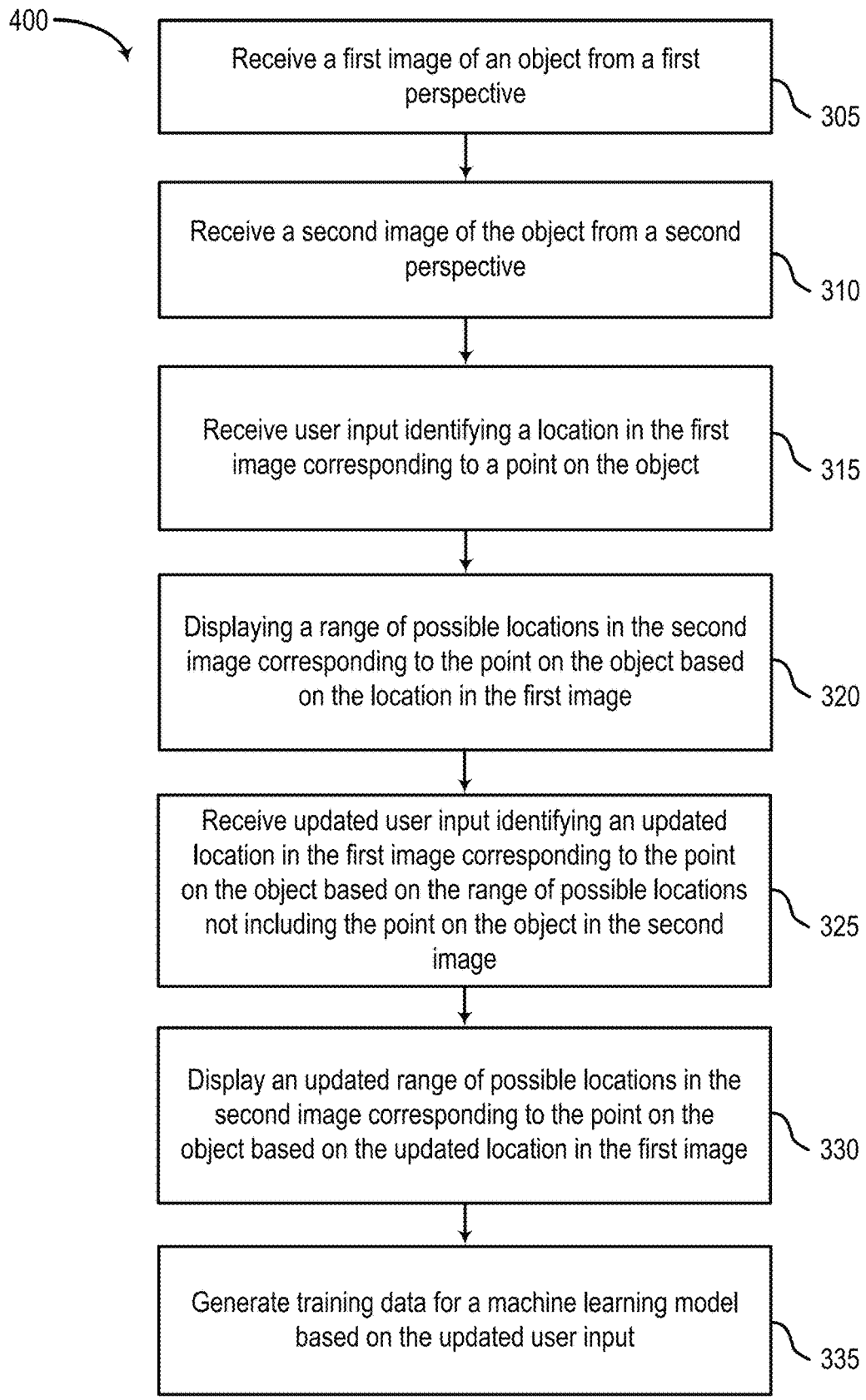
FIG. 3 depicts example operations related to generating three-dimensionally coherent training data for image-detection machine learning models.

FIG. 3 depicts example operations 300 related to three-dimensionally coherent image detection according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations. In some aspects, a processing system 400 of FIG. 4 may perform operations 300.

Operations 300 begin at step 305, with receiving a first image of an object from a first perspective.

Operations 300 continue at step 310, with receiving a second image of the object from a second perspective.

Operations 300 continue at step 315, with receiving user input identifying a location in the first image corresponding to a point on the object.

Operations 300 continue at step 320, with displaying a range of possible locations in the second image corresponding to the point on the object based on the location in the first image.

Some embodiments further comprise displaying, via a user interface, the range of possible locations as a line with respect to the second image.

Operations 300 continue at step 325, with receiving updated user input identifying an updated location in the first image corresponding to the point on the object based on the range of possible locations not including the point on the object in the second image. In some embodiments, the additional user input comprises an indication that the range of possible locations does not include the point on the object. For example, certain embodiments further comprise requesting updated user input identifying an updated location in the first image corresponding to the point on the object.

Operations 300 continue at step 330, with displaying an updated range of possible locations in the second image corresponding to the point on the object based on the updated location in the first image.

Operations 300 continue at step 335, with generating training data for a machine learning model based on the updated user input.

In certain embodiments, the additional user input comprises an indication that the updated range of possible locations includes the point on the object, and the training data comprises the first image labeled with the updated location.

In certain embodiments, additional user input comprises a selection of a given location from the updated range of possible locations, and the training data comprises the first image labeled with the updated location and the second image labeled with the given location.

Some embodiments comprise determining the range of possible locations in the second image corresponding to the point on the object based on the location in the first image and an epipolar constraint. For example, the range of possible locations may comprise a line. In some embodiments, the line is determined based on the location in the first image and optical centers of respective cameras that captured the first image and the second image.

Example Processing System

Figure 4:
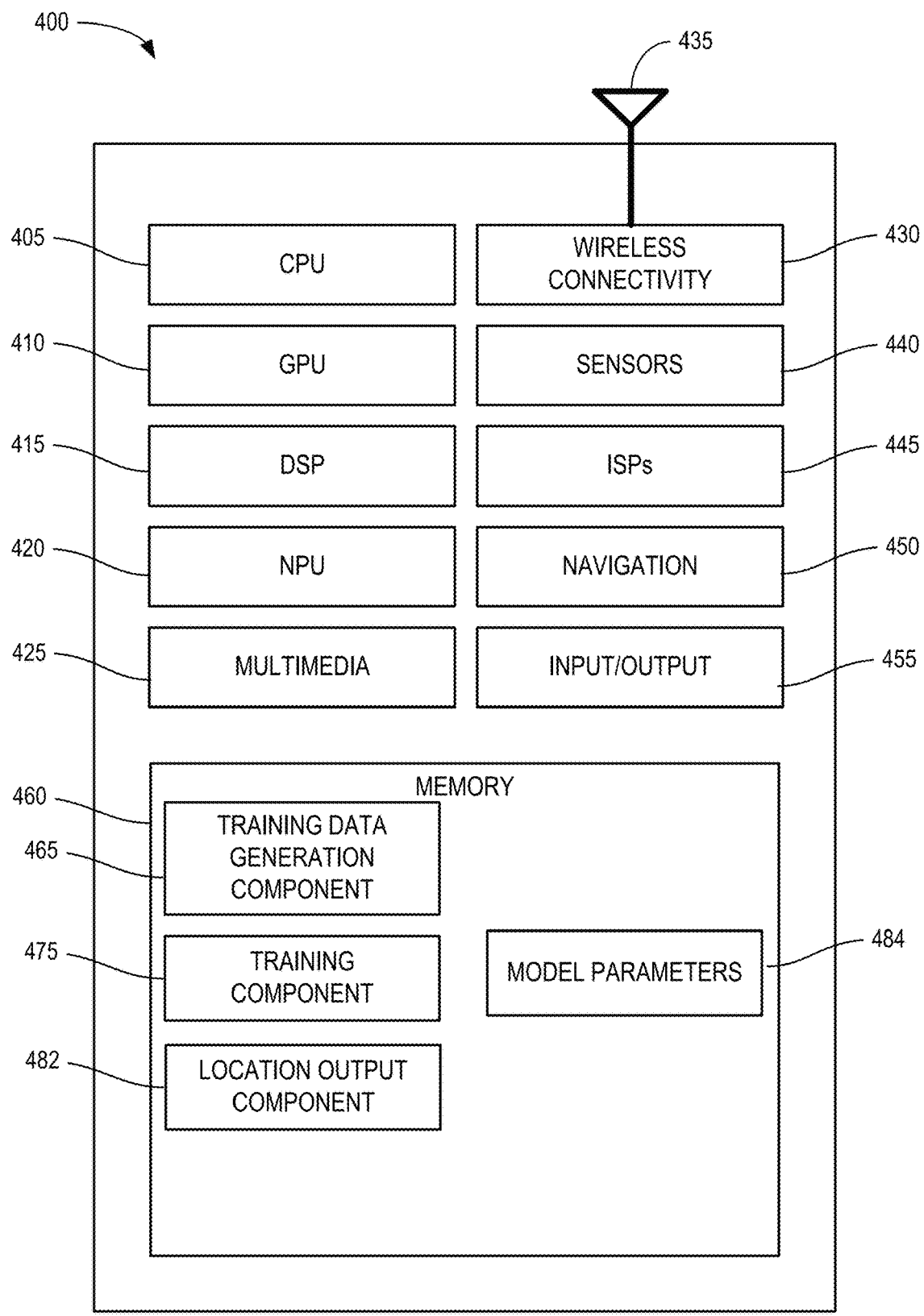
FIG. 4 depicts an example of processing system adapted to perform operations for the techniques disclosed herein, such as the operations depicted and described with respect to FIG. 3.

FIG. 4 depicts an example of processing system 400 that includes various components operable, configured, or adapted to perform operations for the techniques disclosed herein, such as the operations depicted and described with respect to FIG. 3.

Processing system 400 includes a central processing unit (CPU) 405, which in some examples may be a multi-core CPU 405. Instructions executed at the CPU 405 may be loaded, for example, from a program memory 460 associated with the CPU 405 or may be loaded from memory 460 partition.

Processing system 400 also includes additional processing components tailored to specific functions, such as a graphics processing unit (GPU) 410, a digital signal processor (DSP) 415, a neural processing unit (NPU) 420, a multimedia processing unit 425, and a wireless connectivity 430 component.

An NPU 420, such as, is generally a specialized circuit configured for implementing all the necessary control and arithmetic logic for executing machine learning algorithms, such as algorithms for processing artificial neural networks (ANNs), deep neural networks (DNNs), random forests (RFs), kernel methods, and the like. An NPU 420 may sometimes alternatively be referred to as a neural signal processor (NSP), a tensor processing unit (TPU), a neural network processor (NNP), an intelligence processing unit (IPU), or a vision processing unit (VPU).

NPUs 420, such as, may be configured to accelerate the performance of common machine learning tasks, such as image classification, machine translation, object detection, and various other tasks. In some examples, a plurality of NPUs 420 may be instantiated on a single chip, such as a system on a chip (SoC), while in other examples they may be part of a dedicated machine learning accelerator device.

NPUs 420 may be optimized for training or inference, or in some cases configured to balance performance between both. For NPUs 420 that are capable of performing both training and inference, the two tasks may still generally be performed independently.

NPUs 420 designed to accelerate training are generally configured to accelerate the optimization of new models, which is a highly compute-intensive operation that involves inputting an existing dataset (often labeled or tagged), iterating over the dataset, and then adjusting model parameters 484, such as weights and biases, in order to improve model performance. Generally, optimizing based on a wrong prediction involves propagating back through the layers of the model and determining gradients to reduce the prediction error.

NPUs 420 designed to accelerate inference are generally configured to operate on complete models. Such NPUs 420 may thus be configured to input a new piece of data and rapidly process it through an already trained model to generate a model output (e.g., an inference).

In some aspects, NPU 420 may be implemented as a part of one or more of CPU 405, GPU 410, and/or DSP 415.

NPU 420 is a microprocessor that specializes in the acceleration of machine learning algorithms. For example, an NPU 420 may operate on predictive models such as artificial neural networks (ANNs) or random forests (RFs). In some cases, an NPU 420 is designed in a way that makes it unsuitable for general purpose computing such as that performed by CPU 405. Additionally or alternatively, the software support for an NPU 420 may not be developed for general purpose computing.

An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted. During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

A convolutional neural network (CNN) is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

The term "loss function" refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly and a new set of predictions are made during the next iteration.

In some aspects, wireless connectivity 430 component may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity 430 processing component is further connected to one or more antennas 435.

Processing system 400 may also include one or more sensor processing units associated with any manner of sensor, one or more image signal processors (ISPs 445) associated with any manner of image sensor, and/or a navigation 450 processor, which may include satellite-based positioning system components (e.g., GPS or GLONASS) as well as inertial positioning system components.

Processing system 400 may also include one or more input and/or output devices, such as screens, touch-sensitive surfaces (including touch-sensitive displays), physical buttons, speakers, microphones, and the like.

In some examples, one or more of the processors of processing system 400 may be based on an ARM or RISC-V instruction set.

Processing system 400 also includes memory 460, which is representative of one or more static and/or dynamic memories, such as a dynamic random access memory 460, a flash-based static memory 460, and the like. In this example, memory 460 includes computer-executable components, which may be executed by one or more of the aforementioned components of processing system 400.

Examples of memory 460 include random access memory (RAM), read-only memory (ROM), or a hard disk. Examples of memory 460 include solid state memory and a hard disk drive. In some examples, memory 460 is used to store computer-readable, computer-executable software including instructions that, when executed, cause a processor to perform various functions described herein. In some cases, memory 460 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory 460 store information in the form of a logical state.

In particular, in this example, memory 460 includes model parameters 484 (e.g., weights, biases, and other machine learning model parameters 484). One or more of the depicted components, as well as others not depicted, may be configured to perform various aspects of the methods described herein.

Generally, processing system 400 and/or components thereof may be configured to perform the methods described herein.

Notably, in other aspects, aspects of processing system 400 may be omitted, such as where processing system 400 is a server computer or the like. For example, multimedia component 425, wireless connectivity 430, sensors 440, ISPs 445, and/or navigation 450 component may be omitted in other aspects. Further, aspects of processing system 400 may be distributed.

Note that FIG. 4 is just one example, and in other examples, alternative processing system 400 with more, fewer, and/or different components may be used.

In one aspect, processing system 400 includes CPU 405, GPU 410, DSP 415, NPU 420, multimedia 425, wireless connectivity 430, antennas 435, sensors 440, ISPs 445, navigation 450, input/output 455, and memory 460.

In some aspects, sensors 440 may include optical instruments (e.g., an image sensor, camera, etc.) for recording or capturing images, which may be stored locally, transmitted to another location, etc. For example, an image sensor may capture visual information using one or more photosensitive elements that may be tuned for sensitivity to a visible spectrum of electromagnetic radiation. The resolution of such visual information may be measured in pixels, where each pixel may relate an independent piece of captured information. In some cases, each pixel may thus correspond to one component of, for example, a two-dimensional (2D) Fourier transform of an image. Computation methods may use pixel information to reconstruct images captured by the device. In a camera, an image sensors may convert light incident on a camera lens into an analog or digital signal. An electronic device may then display an image on a display panel based on the digital signal. Image sensors are commonly mounted on electronics such as smartphones, tablet personal computers (PCs), laptop PCs, and wearable devices.

In some aspects, sensors 440 may include direct depth sensing sensors, such as radar, LIDAR, and other depth sensing sensors, as described herein.

An input/output 455 (e.g., an I/O controller) may manage input and output signals for a device. Input/output 455 may also manage peripherals not integrated into a device. In some cases, input/output 455 may represent a physical connection or port to an external peripheral. In some cases, input/output 455 may utilize an operating system. In other cases, input/output 455 may represent or interact with a modem, a keyboard, a mouse, a touchscreen, or a similar device. In some cases, input/output 455 may be implemented as part of a processor (e.g., CPU 405). In some cases, a user may interact with a device via input/output 455 or via hardware components controlled by input/output 455.

In one aspect, memory 460 includes training data generation component 465, training component 475, location output component 482, and model parameters 484.

According to some aspects, training data generation component 465 performs operations described herein related to a guided feedback loop for generating three-dimensionally coherent training data for image detection machine learning models. For example, training data generation component 465 may perform operations 300 of FIG. 3.

According to some aspects, training component 475 trains a machine learning model using training data generated by training data generation component 465, such as using supervised learning techniques.

According to some aspects, location output component 482 generates inferences, such as locations of points on object in images. In some examples, location output component 482 may perform utilize a machine learning model trained using training data generated by training data generation component 465, such as according to operations 300 described above with respect to FIG. 3, such as machine learning model 220 of FIG. 2. For instance, machine learning model 220 of FIG. 2 may run on system 400.

In some example, such as where processing system 400 is a server computer, certain aspects may be omitted, such as wireless connectivity component 430, antenna(s) 435, multimedia component 425, navigation component 450, and sensor(s) 440.

Notably, FIG. 4 is just use example, and many other examples and configurations of processing system 400 are possible, including implementations involving multiple computing devices.

Example Clauses

Implementation examples are described in the following numbered clauses:

Clause 1: A method, comprising: receiving a first image of an object from a first perspective; receiving a second image of the object from a second perspective; receiving user input identifying a location in the first image corresponding to a point on the object; displaying a range of possible locations in the second image corresponding to the point on the object based on the location in the first image; receiving updated user input identifying an updated location in the first image corresponding to the point on the object based on the range of possible locations not including the point on the object in the second image; displaying an updated range of possible locations in the second image corresponding to the point on the object based on the updated location in the first image; and generating training data for a machine learning model based on the updated user input.

Clause 2: The method of Clause 1, wherein the training data comprises the first image labeled with the updated location.

Clause 3: The method of any one of Clause 1-2, further comprising receiving additional user input indicating that the updated range of possible locations includes the point on the object.

Clause 4: The method of any one of Clause 1-3, further comprising receiving additional user input selecting a given location from the updated range of possible locations, and wherein the training data comprises the first image labeled with the updated location and the second image labeled with the given location.

Clause 5: The method of any one of Clause 1-4, further comprising determining the range of possible locations in the second image corresponding to the point on the object based on the location in the first image and an epipolar constraint.

Clause 6: The method of any one of Clause 1-5, wherein the range of possible locations comprises a line.

Clause 7: The method of Clause 6, wherein the line is determined based on the location in the first image and optical centers of respective cameras that captured the first image and the second image.

Clause 8: The method of any one of Clause 1-7, further comprising receiving additional user input indicating that the range of possible locations does not include the point on the object in the second image Clause 9: A processing system, comprising: a memory comprising computer-executable instructions; one or more processors configured to execute the computer-executable instructions and cause the processing system to: receive a first image of an object from a first perspective; receive a second image of the object from a second perspective; receive user input identifying a location in the first image corresponding to a point on the object; display a range of possible locations in the second image corresponding to the point on the object based on the location in the first image; receive updated user input identifying an updated location in the first image corresponding to the point on the object based on the range of possible locations not including the point on the object in the second image; display an updated range of possible locations in the second image corresponding to the point on the object based on the updated location in the first image; and generate training data for a machine learning model based on the updated user input.

Clause 10: The processing system of Clause 9, wherein the training data comprises the first image labeled with the updated location.

Clause 11: The processing system of any one of Clause 9-10, wherein the one or more processors are further configured to cause the processing system to receive additional user input indicating that the updated range of possible locations includes the point on the object.

Clause 12: The processing system of any one of Clause 9-11, wherein the one or more processors are further configured to cause the processing system to receive additional user input selecting a given location from the updated range of possible locations, and wherein the training data comprises the first image labeled with the updated location and the second image labeled with the given location.

Clause 13: The processing system of any one of Clause 9-12, wherein the one or more processors are further configured to cause the processing system to determine the range of possible locations in the second image corresponding to the point on the object based on the location in the first image and an epipolar constraint.

Clause 14: The processing system of any one of Clause 9-13, wherein the range of possible locations comprises a line.

Clause 15: The processing system of Clause 14, wherein the line is determined based on the location in the first image and optical centers of respective cameras that captured the first image and the second image.

Clause 16: The processing system of any one of Clause 9-15, wherein the one or more processors are further configured to receive additional user input indicating that the range of possible locations does not include the point on the object in the second image.

Clause 17: A non-transitory computer readable medium comprising instructions that, when executed by one or more processors of a computing system, cause the computing system to: receive a first image of an object from a first perspective; receive a second image of the object from a second perspective; receive user input identifying a location in the first image corresponding to a point on the object; display a range of possible locations in the second image corresponding to the point on the object based on the location in the first image; receive updated user input identifying an updated location in the first image corresponding to the point on the object based on the range of possible locations not including the point on the object in the second image; display an updated range of possible locations in the second image corresponding to the point on the object based on the updated location in the first image; and generate training data for a machine learning model based on the updated user input.

Clause 18: The non-transitory computer readable medium of Clause 17, wherein the training data comprises the first image labeled with the updated location.

Clause 19: The non-transitory computer readable medium of any one of Clause 17-18, wherein the instructions, when executed by the one or more processors, further cause the computing system to receive additional user input indicating that the updated range of possible locations includes the point on the object.

Clause 20: The non-transitory computer readable medium of any one of Clause 17-19, wherein the instructions, when executed by the one or more processors, further cause the computing system to receive additional user input selecting a given location from the updated range of possible locations, and wherein the training data comprises the first image labeled with the updated location and the second image labeled with the given location.

Clause 21: The non-transitory computer readable medium of any one of Clause 17-20, wherein the instructions, when executed by the one or more processors, further cause the computing system to determine the range of possible locations in the second image corresponding to the point on the object based on the location in the first image and an epipolar constraint.

Clause 22: The non-transitory computer readable medium of any one of Clause 17-21, wherein the range of possible locations comprises a line.

Clause 23: The non-transitory computer readable medium of Clause 22, wherein the line is determined based on the location in the first image and optical centers of respective cameras that captured the first image and the second image.

Clause 24: An apparatus, comprising: means for receiving a first image of an object from a first perspective; means for receiving a second image of the object from a second perspective; means for receiving user input identifying a location in the first image corresponding to a point on the object; means for displaying a range of possible locations in the second image corresponding to the point on the object based on the location in the first image; means for receiving updated user input identifying an updated location in the first image corresponding to the point on the object based on the range of possible locations not including the point on the object in the second image; means for displaying an updated range of possible locations in the second image corresponding to the point on the object based on the updated location in the first image; and means for generating training data for a machine learning model based on the updated user input.

Clause 25: The apparatus of Clause 24, wherein the training data comprises the first image labeled with the updated location.

Clause 26: The apparatus of any one of Clause 24-25, further comprising means for receiving additional user input indicating that the updated range of possible locations includes the point on the object.

Clause 27: The apparatus of any one of Clause 24-26, further comprising means for receiving additional user input selecting a given location from the updated range of possible locations, and wherein the training data comprises the first image labeled with the updated location and the second image labeled with the given location.

Clause 28: The apparatus of any one of Clause 24-27, further comprising means for determining the range of possible locations in the second image corresponding to the point on the object based on the location in the first image and an epipolar constraint.

Clause 29: The apparatus of any one of Clause 24-28, wherein the range of possible locations comprises a line.

Clause 30: The apparatus of Clause 29, wherein the line is determined based on the location in the first image and optical centers of respective cameras that captured the first image and the second image.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
    receiving a first image of an object from a first perspective;
    receiving a second image of the object from a second perspective;
    receiving user input identifying a selected location of a point on the object in the first image;
    displaying a line indicating a range of possible locations of the point on the object in the second image based on the selected location of the point on the object in the first image, wherein the range of possible locations does not include the point on the object in the second image;
    after the displaying of the line, receiving updated user input identifying an updated selected location of the point on the object in the first image based on the range of possible locations not including the point on the object in the second image;
    displaying an updated line indicating an updated range of possible locations of the point on the object in the second image based on the updated selected location of the point on the object in the first image, wherein the updated range of possible locations includes the point on the object in the second image; and
    generating training data for a machine learning model based on the updated user input.

2. The method of claim 1, wherein the training data comprises the first image labeled with the updated selected location.

3. The method of claim 1, further comprising receiving additional user input indicating that the updated range of possible locations includes the point on the object.

4. The method of claim 1, further comprising receiving additional user input selecting a given location from the updated range of possible locations, and wherein the training data comprises the first image labeled with the updated selected location and the second image labeled with the given location.

5. The method of claim 1, further comprising determining the range of possible locations of the point on the object in the second image based on the selected location in the first image and an epipolar constraint.

6. The method of claim 1, wherein the line is determined based on the selected location in the first image and optical centers of respective cameras that captured the first image and the second image.

7. The method of claim 1, further comprising receiving additional user input indicating that the range of possible locations does not include the point on the object in the second image.

8. A processing system, comprising:
a memory comprising computer-executable instructions;
one or more processors configured to execute the computer-executable instructions and cause the processing system to:
receive a first image of an object from a first perspective;
receive a second image of the object from a second perspective;
receive user input identifying a selected location of a point on the object in the first image;
display a line indicating a range of possible locations of the point on the object in the second image based on the selected location of the point on the object in the first image, wherein the range of possible locations does not include the point on the object in the second image;
after the displaying of the line, receive updated user input identifying an updated selected location of the point on the object in the first image based on the range of possible locations not including the point on the object in the second image;
display an updated line indicating an updated range of possible locations of the point on the object in the second image based on the updated selected location of the point on the object in the first image, wherein the updated range of possible locations includes the point on the object in the second image; and
generate training data for a machine learning model based on the updated user input.

9. The processing system of claim 8, wherein the training data comprises the first image labeled with the updated selected location.

10. The processing system of claim 8, wherein the one or more processors are further configured to cause the processing system to receive additional user input indicating that the updated range of possible locations includes the point on the object.

11. The processing system of claim 8, wherein the one or more processors are further configured to cause the processing system to receive additional user input selecting a given location from the updated range of possible locations, and wherein the training data comprises the first image labeled with the updated selected location and the second image labeled with the given location.

12. The processing system of claim 8, wherein the one or more processors are further configured to cause the processing system to determine the range of possible locations of the point on the object in the second image based on the selected location in the first image and an epipolar constraint.

13. The processing system of claim 8, wherein the line is determined based on the selected location in the first image and optical centers of respective cameras that captured the first image and the second image.

14. The processing system of claim 8, wherein the one or more processors are further configured to receive additional user input indicating that the range of possible locations does not include the point on the object in the second image.

15. A non-transitory computer readable medium comprising instructions that, when executed by one or more processors of a computing system, cause the computing system to:
receive a first image of an object from a first perspective;
receive a second image of the object from a second perspective;
receive user input identifying a selected location of a point on the object in the first image;
display a line indicating a range of possible locations of the point on the object in the second image based on the selected location of the point on the object in the first image, wherein the range of possible locations does not include the point on the object in the second image;
after the displaying of the line, receive updated user input identifying an updated selected location of the point on the object in the first image based on the range of possible locations not including the point on the object in the second image;
display an updated line indicating an updated range of possible locations of the point on the object in the second image based on the updated selected location of the point on the object in the first image, wherein the updated range of possible locations includes the point on the object in the second image; and
generate training data for a machine learning model based on the updated user input.

16. The non-transitory computer readable medium of claim 15, wherein the training data comprises the first image labeled with the updated selected location.

17. The non-transitory computer readable medium of claim 15, wherein the instructions, when executed by the one or more processors, further cause the computing system to receive additional user input indicating that the updated range of possible locations includes the point on the object.

18. The non-transitory computer readable medium of claim 15, wherein the instructions, when executed by the one or more processors, further cause the computing system to receive additional user input selecting a given location from the updated range of possible locations, and wherein the training data comprises the first image labeled with the updated selected location and the second image labeled with the given location.

19. The non-transitory computer readable medium of claim 15, wherein the instructions, when executed by the one or more processors, further cause the computing system to determine the range of possible locations of the point on the object in the second image based on the selected location in the first image and an epipolar constraint.

20. The non-transitory computer readable medium of claim 15, wherein the line is determined based on the selected location in the first image and optical centers of respective cameras that captured the first image and the second image.

21. An apparatus, comprising:
- means for receiving a first image of an object from a first perspective;
- means for receiving a second image of the object from a second perspective;
- means for receiving user input identifying a selected location of a point on the object in the first image;
- means for displaying a line indicating a range of possible locations of the point on the object in the second image based on the selected location of the point on the object in the first image, wherein the range of possible locations does not include the point on the object in the second image;
- means for, after the displaying of the line, receiving updated user input identifying an updated selected location of the point on the object in the first image based on the range of possible locations not including the point on the object in the second image;
- means for displaying an updated line indicating an updated range of possible locations of the point on the object in the second image based on the updated selected location of the point on the object in the first image, wherein the updated range of possible locations includes the point on the object in the second image; and
- means for generating training data for a machine learning model based on the updated user input.

22. The apparatus of claim 21, wherein the training data comprises the first image labeled with the updated selected location.

23. The apparatus of claim 21, further comprising means for receiving additional user input indicating that the updated range of possible locations includes the point on the object.

24. The apparatus of claim 21, further comprising means for receiving additional user input selecting a given location from the updated range of possible locations, and wherein the training data comprises the first image labeled with the updated selected location and the second image labeled with the given location.

25. The apparatus of claim 21, further comprising means for determining the range of possible locations of the point on the object in the second image based on the selected location in the first image and an epipolar constraint.

26. The apparatus of claim 21, wherein the line is determined based on the selected location in the first image and optical centers of respective cameras that captured the first image and the second image.

* * * * *